United States Patent
Panseri et al.

(10) Patent No.: US 8,915,335 B2
(45) Date of Patent: Dec. 23, 2014

(54) DEVICE FOR ELECTRICAL BRAKING OF A DRIVE SHAFT

(75) Inventors: Anne-Sophie Panseri, Montanay (FR); Armand Poyet, Lyons (FR); Romain Simon, Caluire (FR)

(73) Assignee: Sofineco, Decines Charpieu (FR)

( * ) Notice: Subject to any disclaimer, the term of this patent is extended or adjusted under 35 U.S.C. 154(b) by 300 days.

(21) Appl. No.: 13/402,050

(22) Filed: Feb. 22, 2012

(65) Prior Publication Data

US 2012/0211313 A1 Aug. 23, 2012

Related U.S. Application Data

(60) Provisional application No. 61/446,610, filed on Feb. 25, 2011.

(30) Foreign Application Priority Data

Feb. 23, 2011 (FR) .................................... 11 00540

(51) Int. Cl.
| | |
|---|---|
| *F16D 55/08* | (2006.01) |
| *F16D 55/2265* | (2006.01) |
| *F16D 121/20* | (2012.01) |
| *F16D 55/00* | (2006.01) |
| *F16D 121/22* | (2012.01) |

(52) U.S. Cl.
CPC ........ *F16D 55/2265* (2013.01); *F16D 2121/20* (2013.01); *F16D 2055/0062* (2013.01); *F16D 2121/22* (2013.01)
USPC .......................................... 188/72.1; 160/188

(58) Field of Classification Search
CPC .................... F16D 55/2265; F16D 2055/0062; F16D 2121/20; F16D 2121/22
USPC ...... 188/71.1, 70 R, 72.1, 72.9, 73.31, 73.39, 188/158, 161, 206 R; 160/8, 188, 189, 291, 160/298

See application file for complete search history.

(56) References Cited

U.S. PATENT DOCUMENTS

| | | | | |
|---|---|---|---|---|
| 4,042,077 | A | * | 8/1977 | McCarthy ..................... 188/171 |
| 4,374,552 | A | * | 2/1983 | Dayen ........................... 188/72.9 |
| 5,019,734 | A | * | 5/1991 | Bernd et al. .................... 310/77 |
| 5,195,386 | A | * | 3/1993 | Havens et al. ................ 74/411.5 |
| 5,197,575 | A | * | 3/1993 | Mangum et al. ............. 188/72.9 |
| 6,374,960 | B1 | * | 4/2002 | Hukill et al. ................ 188/73.43 |

(Continued)

FOREIGN PATENT DOCUMENTS

FR 2884572 A1 * 10/2006

*Primary Examiner* — Robert A Siconolfi
*Assistant Examiner* — Charles Poon
(74) *Attorney, Agent, or Firm* — Young & Thompson

(57) ABSTRACT

The electrical braking device according to the present invention includes a braking element (2) which is formed, on the one hand, by electric jaws (7) and at least one sliding block (8) mounted in the proximity of the brake disk (3) in such a way that the latter passes at least partially through the electric jaws (7) and sliding block (8), and, on the other hand, by means (4) for fastening the electric jaws (7) and the sliding block (8) to the fixed frame (6) while providing the jaws and block with degrees of freedom obtained by the combination of different connections of the "flat plane contact" (FC), "point contact" (PC) and "annular linear contact" (AC) types, in order to compensate for the misalignments and defects in the shape of the brake disk (3) when the latter is driven in rotation.

8 Claims, 4 Drawing Sheets

(56) References Cited

U.S. PATENT DOCUMENTS

| | | | |
|---|---|---|---|
| 8,550,219 B2* | 10/2013 | Eberle et al. | 188/171 |
| 2009/0032340 A1* | 2/2009 | Smith | 187/250 |
| 2010/0242364 A1* | 9/2010 | Magro | 49/31 |
| 2012/0031715 A1* | 2/2012 | Conway | 188/72.3 |

\* cited by examiner

DEVICE FOR ELECTRICAL BRAKING OF A DRIVE SHAFT

The present invention relates to a device for the electrical braking of a drive shaft, which can be adapted, for example, to a drive shaft of a goods-handling door with a flexible shutter of the roll-up or stacking type.

BACKGROUND OF THE INVENTION

There are known mechanical systems having braking systems with electrical actuators, a braking system of this type being known as an electromagnetic system.

DESCRIPTION OF THE RELATED ART

The type of brake used in this case is known as a zero current brake or safety brake, which has to carry out the braking action when there is no electrical power supply. For reasons of cost, the system is usually composed of disks and blocks of material with a high coefficient of friction.

The blocks can be in the form of sectors of disks (in what are known as jaw brakes) or in the form of disks (in what are known as disk brakes). In these systems, braking is carried out by means of springs pressing on the blocks.

The braking action is canceled by the magnetic action of an electromagnet, which acts in opposition to the springs when supplied with electricity.

Since the actuators (known as magnetic actuators, or electromagnets) are not capable of producing large movements by their operation, a gap is specified such that the maximum required movement of the brake jaws is only a few tenths of a millimeter (usually not more than 0.5 mm).

This requirement means that the disk and the jaws must be positioned in a highly precise way between the drive shaft and the braking element for correct operation.

SUMMARY OF THE INVENTION

The object of the electrical braking device according to the present invention is to improve these types of braking systems so that they can be used in structures in which the various mechanical components of the braking element are not positioned, or cannot be positioned, in a precise way with respect to the drive shaft.

The electrical braking device according to the present invention is therefore designed to guide the braking element with respect to the brake disk by using fastening means providing degrees of freedom in order to compensate for misalignments and defects in the shape of the brake disk when the latter is driven in rotation.

The electrical braking device according to the present invention includes a braking element which is formed, on the one hand, by electric jaws and at least one sliding block mounted in the proximity of the brake disk in such a way that the latter passes at least partially through the electric jaws and sliding block, and, on the other hand, by means for fastening the electric jaws and the sliding block to the fixed frame while providing the jaws and block with degrees of freedom obtained by the combination of different connections of the "flat plane contact" (FC), "point contact" (PC) and "annular linear contact" (AC) types, in order to compensate for the misalignments of the brake disk when the latter is driven in rotation.

The electrical braking device according to the present invention includes a braking element comprising a plate on which the electric jaws and the sliding blocks are arranged, the plate being guided and retained with respect to the frame by means of the different "point contact" (PC) and "annular linear contact" (AC) connections of the fastening means.

The electrical braking device according to the present invention includes a "point contact" (PC) connection, formed by means of a first pin fixed to the frame and extending perpendicularly thereto in a horizontal direction parallel to the axis of the brake disk, so as to interact with an oblong fork-like opening formed in the upper part of the plate.

The electrical braking device according to the present invention includes an "annular linear contact" (AC) connection, formed by a second pin fixed to the frame and extending perpendicularly thereto in a horizontal direction parallel to the axis of the brake disk, and by a swivel joint pierced in its center and arranged in a bore formed in the lower part of the plate in such a way that the swivel joint is placed around the second pin.

The electrical braking device according to the present invention includes a "flat plane contact" (FC) connection, obtained by mounting the sliding blocks on the plate, the blocks being in adjusted frictional contact with the brake disk in such a way that the gap between the electric jaws is guided and positioned relative to the position of the brake disk when the latter is driven in rotation.

The electrical braking device according to the present invention includes sliding blocks, each comprising a channel through which the brake disk passes.

The electrical braking device according to the present invention includes sliding blocks, each of which has a channel which is adjusted with an operating clearance in the range from 0.1 mm to 3 mm with respect to the brake disk fixed to the drive shaft.

The electrical braking device according to the present invention includes a drive shaft which is guided axially in a fixed frame formed by the lateral uprights of a flexible shutter goods-handling door, for the purpose of moving the door between an open position and a closed position.

BRIEF DESCRIPTION OF THE DRAWING FIGURES

The following description which refers to the appended drawings, provided by way of non-limiting example, will assist in the understanding of the invention, its characteristics and the advantages which it can provide.

DETAILED DESCRIPTION OF THE INVENTION

Figure 1:
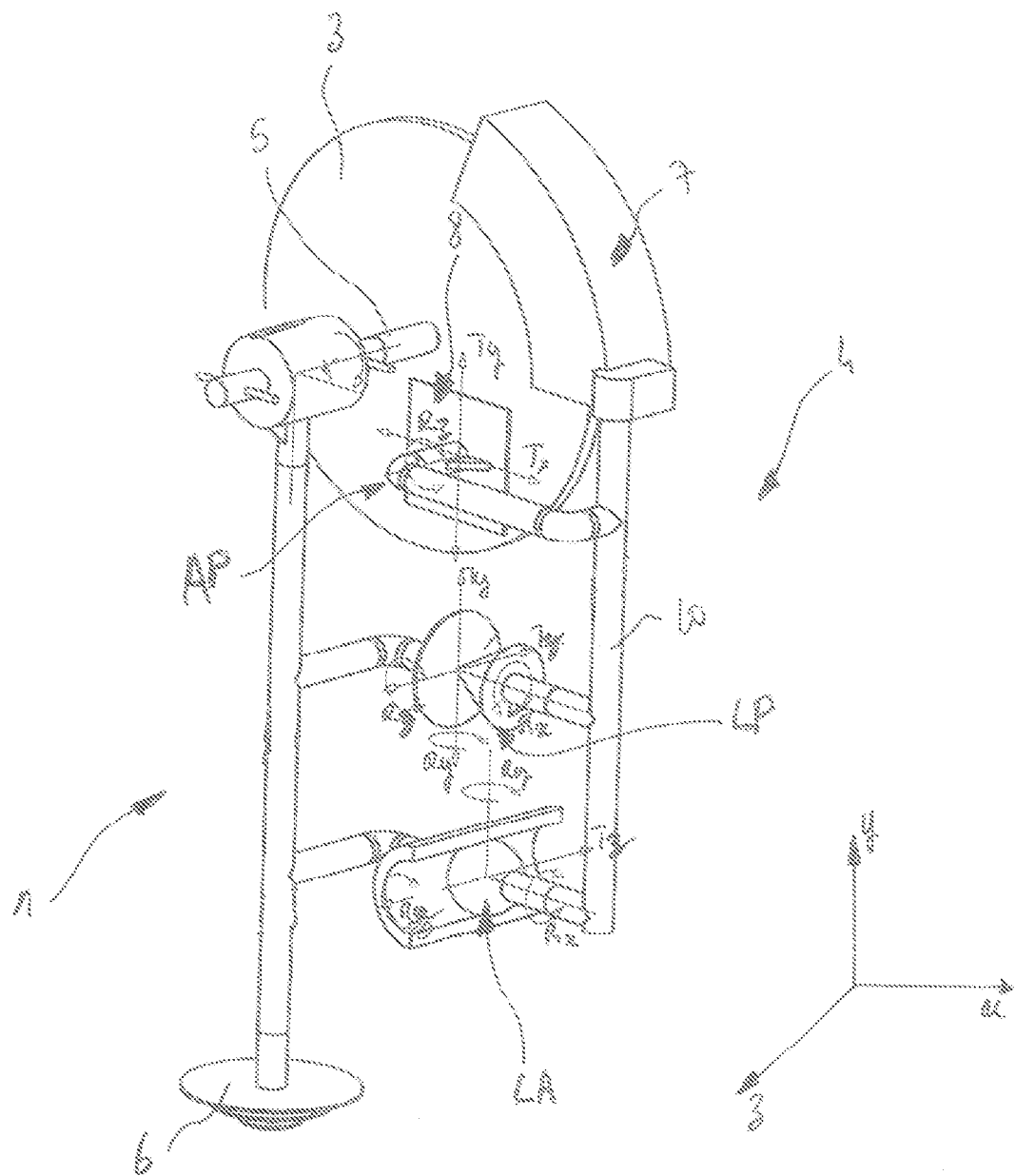
FIG. 1 is a schematic view showing the combination of annular linear, point, and flat plane connections, used in order to provide an electrical braking device which can compensate for the misalignments and defects in the shape of a brake disk when the latter is driven in rotation according to the present invention.

FIG. 1 is a schematic view of an electrical braking device 1 according to the present invention which has the object of improving the guiding of a braking element 2 with respect to a brake disk 3 by using fastening means 4 which provide degrees of freedom such that the misalignments and defects in the shape of the brake disk 3 can be compensated for when the latter is driven in rotation.

The fastening means 4 are formed by a combination of FC, PC and AC connections which can, for example, be mounted in parallel to provide the necessary degrees of freedom to compensate for the misalignments of the brake disk 3 when the latter is driven in rotation by means of a drive shaft 5 guided axially at each end in a frame 6.

The fastening means 4 serve to provide the electric jaws 7 of the electrical braking device 1 with the degrees of freedom obtained by the combination of the three different FC, PC and AC connections in order to compensate for the misalignments of the brake disk 3 when the latter is driven in rotation.

Thus the fastening means 4 are formed by a first "flat plane contact" (FC) connection, providing three degrees of freedom with respect to a common reference frame x, y, z, namely two translations Tx, Ty and a rotation in the direction Rz.

The fastening means 4 are formed by a second "point contact" (PC) connection, providing five degrees of freedom with respect to the common reference frame x, y, z, namely two translations Ty, Tz and three rotations in the directions Rx, Ry and Rz.

Finally, the fastening means 4 are formed by a third "annular linear contact" (AC) connection, providing four degrees of freedom with respect to the common reference frame x, y, z, namely one translation Tz and three rotations in the directions Rx, Ry and Rz.

Figure 2:
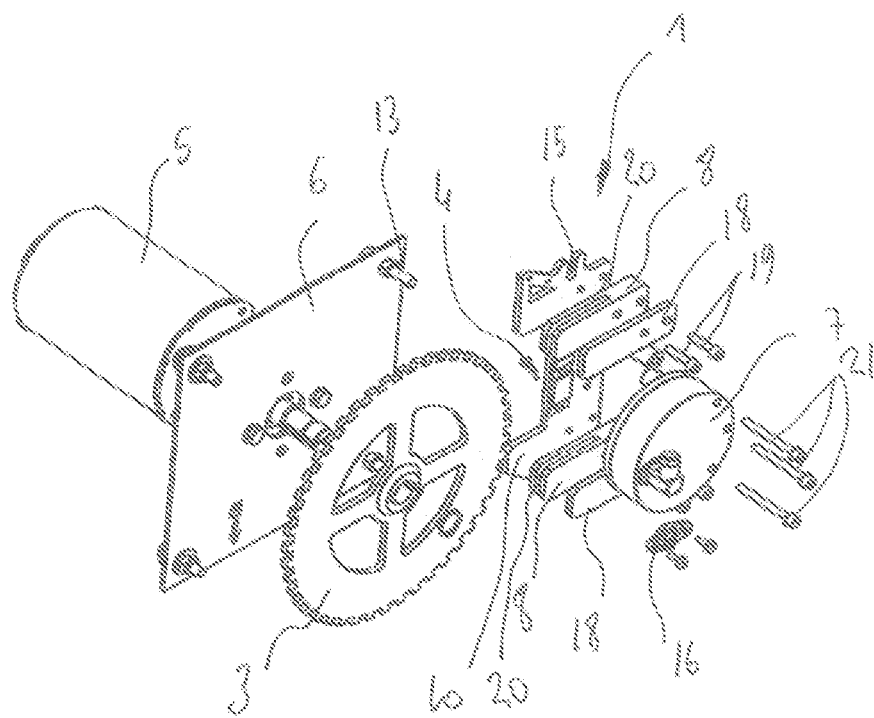
FIG. 2 is an exploded perspective view showing all the components of the electrical braking device according to the present invention.
Figure 3:
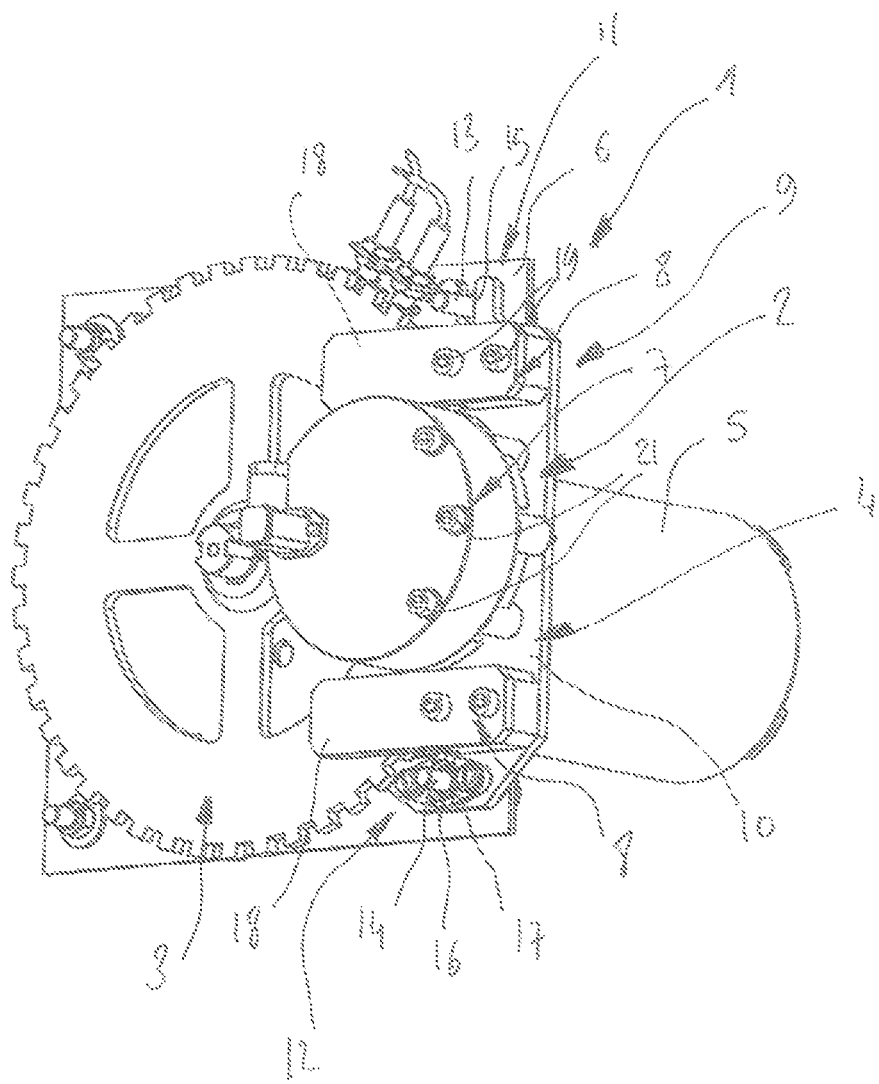
FIGS. 3 and 4 are perspective views showing the electrical braking device according to the present invention.
Figure 4:
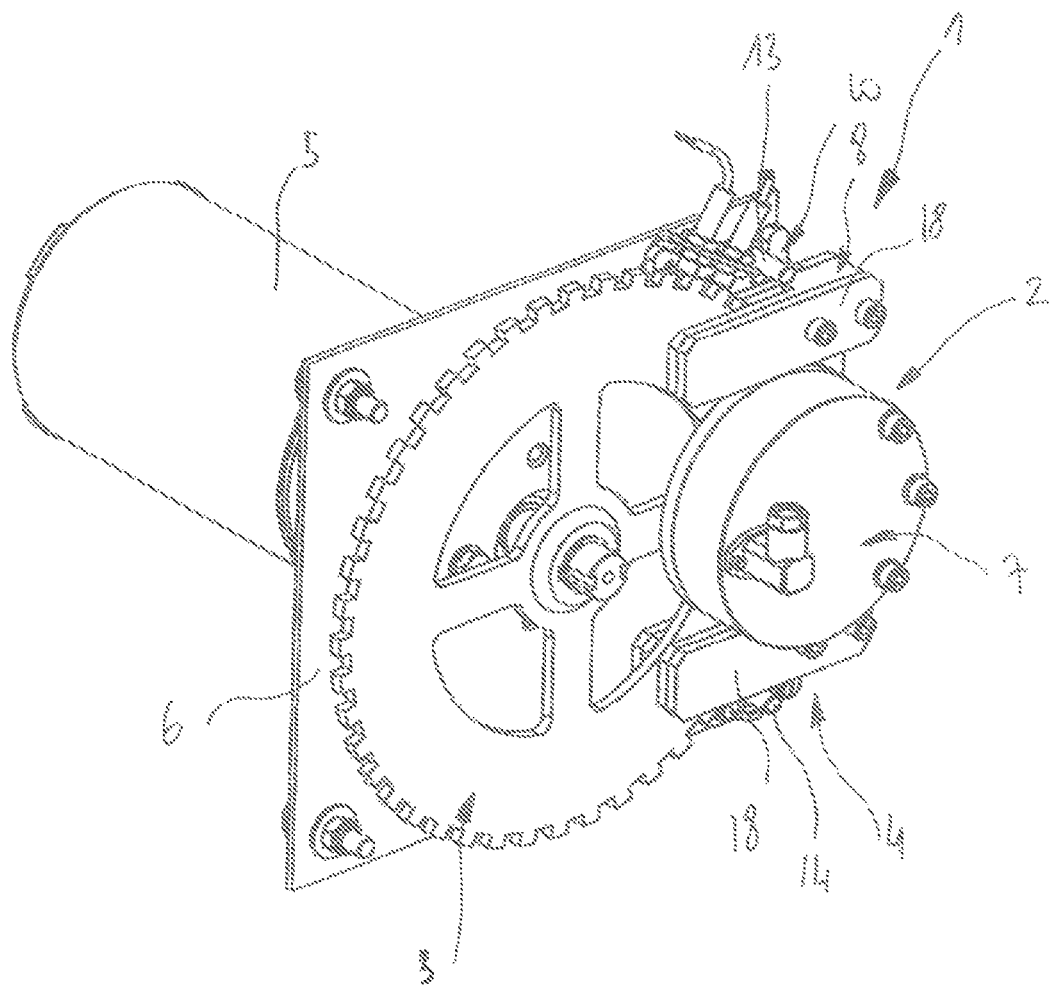

FIGS. 1 to 3 show an exemplary embodiment of the fastening means 4 of the electrical braking device 1 according to the present invention which has the object of improving the guiding of a braking element 2 with respect to a brake disk 3 and providing degrees of freedom such that the misalignments of the brake disk 3 can be compensated for when the latter is driven in rotation.

The braking device 1 is mounted at the end of a drive shaft 5 guided axially at each end in a frame 6 which can be, for example but not exclusively, the vertical and lateral frame of a flexible shutter goods-handling door.

Thus at least one of the ends of the drive shaft 5 passing through the frame 6 interacts with a brake disk 3 which can be, for example, fitted to its periphery by a spline connection.

The braking device 1 includes a braking element 2 comprising a plate 10 arranged on the frame 6 by means of second and third "annular linear contact" (AC) and "point contact" (PC) connections of the fastening means 4.

The braking element 2 includes at least one electric jaw 7 fastened to the plate 10 in such a way that the latter is mounted in the proximity of the brake disk 3 so that the disk passes at least partially through the electric jaws.

The first "flat plane contact" (FC) connection can be formed by sliding blocks 8 which are arranged, on the one hand, above and below the electric jaws 7, and, on the other hand, in the proximity of the brake disk 3, in such a way that the disk passes at least partially through the sliding blocks.

By way of non-limiting example, the "point contact" (PC) connection can be formed by means of a first pin 13 fixed to the frame 6 and extending perpendicularly thereto in a horizontal direction parallel to the axis of the brake disk 3, so as to interact with an oblong fork-like opening 15 formed in the upper part of the plate 10.

The "annular linear contact" (AC) connection can be formed by a second pin 14 fixed to the frame 6 and extending perpendicularly thereto in a horizontal direction parallel to the axis of the brake disk 3. A swivel joint 16 pierced in its center is placed around the second pin 14 and arranged in a bore 17 formed in the lower part of the plate 10.

Thus the "annular linear contact" (AC) and "point contact" (PC) connections allow the plate 10, which is guided around the pins 13, 14, to move freely with respect to the frame 6, by swinging around the swivel joint 16, on the one hand, and by moving laterally along the pins 13, 14 toward and/or away from the frame 6, on the other hand.

By swinging around the swivel joint 16, the upper part of the plate 10 in the vicinity of the fork 15 can be inclined either toward the frame 6 or away from the frame.

By moving laterally, the plate 10 can slide along the pins 13, 14 so as to move in a parallel plane toward and/or away from the frame 6.

The combination of these movements provides the plate 10, which is fixed to the electric jaws 7 and the sliding blocks 8, with the degrees of freedom of the "annular linear contact" (AC) and "point contact" (PC) connections, in such a way that the misalignments and defects in the shape of the brake disk 3 when it is driven in rotation can be compensated for.

The "flat plane contact" (FC) connection is obtained, for example, by mounting the sliding blocks 8 on the plate 10 which are in adjusted frictional contact with the brake disk 3 in such a way that the gap between the electric jaws 7 is guided and positioned with respect to the position of the brake disk 3 when the latter is driven in rotation.

Each of the sliding blocks 8 comprises a channel 20 through which the brake disk 3 passes, the channel being adjusted with sufficient operating clearance which can be in the range from 0.1 mm to 3 mm with respect to the brake disk 3 fixed to the drive shaft 5.

In this exemplary embodiment, each sliding block 8 is fastened to the plate 10 by means of a strip 18 and bolts 19 adapted to hold the sliding block between the plate and the strip in a sandwich configuration.

In this same way, in this exemplary embodiment, the braking element 2 includes a sliding block 8 on each side of the electric jaws 7, in other words one above and one below the electric jaws, which are carried on the same horizontal shaft as the brake disk 3.

The electric jaws 7 are fastened, for example, directly to the plate 10 by means of locking screws 21 which are secured in the plate.

It is to be understood that the above description is provided purely by way of example, and does not in any way limit the scope of the invention, from which there would be no departure if the details of embodiment which have been described are replaced by any other equivalents.

The invention claimed is:

1. A device for the electrical braking of a drive shaft (5) which is guided in a fixed frame (6), wherein at least one end of the shaft is fixed to a brake disk (3), the device comprising:
   a braking element (2) which is formed i) by electric jaws (7) and at least one sliding block (8) mounted in proximity of the brake disk (3) in such a way that the brake disk (3) passes at least partially through the electric jaws (7) and the sliding block (8), and ii) by a fastening means (4) that fasten the electric jaws (7) and the sliding block (8) to the fixed frame (6) while providing the electric jaws and the sliding block with degrees of freedom obtained by the combination of different connections of flat plane contact (FC), point contact (PC) and annular linear contact (AC), in order to compensate for the misalignments and defects in a shape of the brake disk (3) when the brake disk (3) is driven in rotation,
   wherein the braking element (2) includes a plate (10) on which the electric jaws (7) and the sliding block (8) are arranged, the plate (10) being guided and retained with respect to the fixed frame (6) by the different point contact (PC) and annular linear contact (AC) connections of the fastening means (4), and wherein the point contact (PC) connection of the fastening means (4) is formed by a first pin (13) fixed to the fixed frame (6) and extending perpendicularly thereto in a horizontal direction parallel to an axis of the brake disk (3), so as to interact with an oblong fork-like opening (15) formed in an upper part of the plate (10).

2. The device for the electrical braking of a drive shaft according to Claim 1, wherein the annular linear contact (AC) connection of the fastening means (4) is formed by a second pin (14) fixed to the fixed frame (6) and extending perpendicularly thereto in a horizontal direction parallel to the axis of the brake disk (3), and by a swivel joint (16) pierced in a center thereof and arranged in a bore (17) formed in a lower part of the plate (10), in such a way that the swivel joint is placed around the second pin (14).

3. The device for the electrical braking of a drive shaft according to claim 1, the flat plane contact (FC) connection is obtained by mounting the sliding block (8) on the plate (10), the block being in adjusted frictional contact with the brake disk (3) in such a way that a gap between the electric jaws (7) is guided and positioned relative to a position of the brake disk (3) when the brake disk (3) is driven in rotation.

4. The device for the electrical braking of a drive shaft according to claim 3, wherein the sliding block (8) includes a channel (20) through which the brake disk (3) passes.

5. The device for the electrical braking of a drive shaft according to Claim 4, wherein the channel (20) of the sliding block (8) is adjusted with an operating clearance in a range from 0.1 mm to 3 mm with respect to the brake disk which is fixed to the drive shaft.

6. The device for the electrical braking of a drive shaft according to claim 1, wherein the drive shaft (5) is guided axially in the fixed frame (6).

7. The device for the electrical braking of a drive shaft according to claim 2, wherein,
the first and second pins (13, 14) guide movement of the plate (10), and
the annular linear contact (AC) and point contact (PC) connections allow the plate (10), guided around the first and second pins (13, 14), to move freely with respect to the fixed frame (6), i) by swinging around the swivel joint (16), and ii) by moving laterally along the first and second pins (13, 14) toward and away from the frame (6).

8. A device for the electrical braking of a drive shaft (5) which is guided in a fixed frame (6), wherein at least one end of the shaft is fixed to a brake disk (3), comprising:
a braking element (2) which is formed i) by electric jaws (7) and at least one sliding block (8) mounted in proximity of the brake disk (3) in such a way that the brake disk (3) passes at least partially through the electric jaws (7) and sliding block (8), and ii) by a fastening means (4) that fasten the electric jaws (7) and the sliding block (8) to the fixed frame (6) while providing the electric jaws and the sliding block with degrees of freedom obtained by the combination of different connections of a flat plane contact (FC), point contact (PC) and annular linear contact (AC), in order to compensate for the misalignments and defects in a shape of the brake disk (3) when the brake disk (3) is driven in rotation,
wherein the braking element (2) includes a plate (10) on which the electric jaws (7) and the sliding block (8) are arranged, the plate (10) being guided and retained with respect to the fixed frame (6) by the different point contact (PC) and annular linear contact (AC) connections of the fastening means (4), and
wherein the annular linear contact (AC) connection of the fastening means (4) is formed by a pin (14) fixed to the fixed frame (6) and extending perpendicularly thereto in a horizontal direction parallel to the axis of the brake disk (3), and by a swivel joint (16) pierced in a center thereof and arranged in a bore (17) formed in a lower part of the plate (10), in such a way that the swivel joint is placed around the pin (14).

* * * * *